US012629898B2

(12) United States Patent
Elsharkawy

(10) Patent No.: US 12,629,898 B2
(45) Date of Patent: May 19, 2026

(54) METHODS AND SYSTEMS FOR ENSURING CONSISTENT TENSIONING OF MEMBRANE IN FRAME

(71) Applicant: Stratasys, Inc., Minnetonka, MN (US)

(72) Inventor: Mamdouh Elsharkawy, Oxnard, CA (US)

(73) Assignee: Stratasys, Inc., Minnetonka, MN (US)

( * ) Notice: Subject to any disclaimer, the term of this patent is extended or adjusted under 35 U.S.C. 154(b) by 187 days.

(21) Appl. No.: 18/357,874

(22) Filed: Jul. 24, 2023

(65) Prior Publication Data

US 2024/0034002 A1     Feb. 1, 2024

Related U.S. Application Data

(60) Provisional application No. 63/369,817, filed on Jul. 29, 2022.

(51) Int. Cl.
  *B29C 65/72*     (2006.01)
  *B29C 64/245*    (2017.01)
  *B29C 65/74*     (2006.01)

(52) U.S. Cl.
  CPC ............ *B29C 65/72* (2013.01); *B29C 64/245* (2017.08); *B29C 65/749* (2013.01); *B29C 2791/002* (2013.01); *B29C 2791/006* (2013.01)

(58) Field of Classification Search
  CPC .... B29C 2791/006; B29C 51/10; B29C 51/18
  See application file for complete search history.

(56) References Cited

U.S. PATENT DOCUMENTS

| | | | | |
|---|---|---|---|---|
| 3,307,222 A | * | 3/1967 | Baldwin | B29C 51/10 |
| | | | | 425/173 |
| 3,317,960 A | * | 5/1967 | Kramer | B29C 51/10 |
| | | | | 425/388 |
| 3,368,243 A | * | 2/1968 | Kohen | B29C 51/10 |
| | | | | 425/388 |
| 3,822,978 A | * | 7/1974 | Nichols | B29C 51/10 |
| | | | | 425/388 |

(Continued)

FOREIGN PATENT DOCUMENTS

| | | | | | |
|---|---|---|---|---|---|
| GB | 2545469 A | * | 6/2017 | | A43D 9/00 |
| JP | 2003159741 A | * | 6/2003 | | |

(Continued)

OTHER PUBLICATIONS

International Search Report mailed Oct. 12, 2023, from the ISA/ European Patent Office, for International Application No. PCT/ US2023/028508 (filed Jul. 24, 2023), 18 pgs.

*Primary Examiner* — Jacob J Cigna
(74) *Attorney, Agent, or Firm* — Faegre Drinker Biddle & Reath LLP

(57)     ABSTRACT
A tensioning apparatus for manufacturing a membrane assembly for a three-dimensional printer. The tensioning apparatus may include a base portion, an upper portion, and a jig configured to receive a lower frame piece of a membrane assembly. The jig is arranged on the base portion and shaped to receive a lower frame piece of the membrane assembly. The base portion has a number of holes through an upper plate thereof through which air can be evacuated from the tensioning apparatus when a flexible membrane material is being fitted to the lower frame piece of the membrane assembly.

9 Claims, 9 Drawing Sheets

(56)                    References Cited

U.S. PATENT DOCUMENTS

| | | | | |
|---|---|---|---|---|
| 5,015,167 A | * | 5/1991 | Charles | .................. B29C 51/18 |
| | | | | 425/388 |
| 2019/0358902 A1 | | 11/2019 | Slaczka et al. | |

FOREIGN PATENT DOCUMENTS

| | | | | | |
|---|---|---|---|---|---|
| JP | 2007223218 A | * | 9/2007 | ............. | B29C 43/04 |
| WO | 2021/094659 A1 | | 5/2021 | | |

* cited by examiner

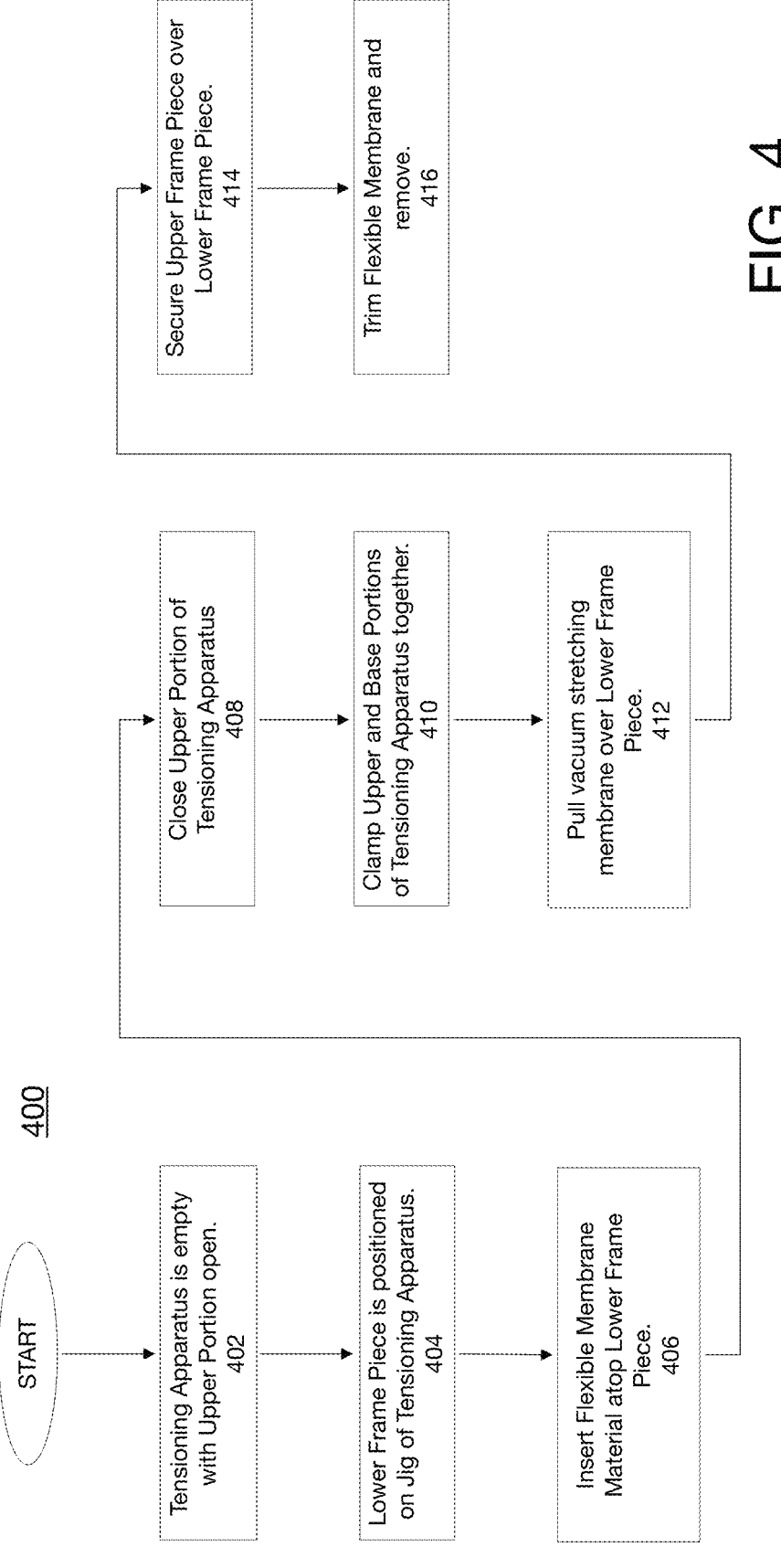

START

Tensioning Apparatus is empty with Upper Portion open.
402

Lower Frame Piece is positioned on Jig of Tensioning Apparatus.
404

Insert Flexible Membrane Material atop Lower Frame Piece.
406

Close Upper Portion of Tensioning Apparatus
408

Clamp Upper and Base Portions of Tensioning Apparatus together.
410

Pull vacuum stretching membrane over Lower Frame Piece.
412

Secure Upper Frame Piece over Lower Frame Piece.
414

Trim Flexible Membrane and remove.
416

METHODS AND SYSTEMS FOR ENSURING CONSISTENT TENSIONING OF MEMBRANE IN FRAME

RELATED APPLICATIONS

This application is a NONPROVISIONAL of, claims priority to, and incorporates by reference U.S. Provisional Application No. 63/369,817, filed 29 Jul. 2022.

FIELD OF THE INVENTION

The present invention relates to additive manufacturing apparatus, particularly those in which a photo-curable resin is cured through exposure to radiation when fabricating an object, and more particularly to such apparatus as employ a flexible membrane within a vat in which the object is fabricated, and methods and systems for ensuring that assemblies which include such a membrane in a frame are constructed in such a manner so as to ensure consistent tensioning of the membranes within their frames.

BACKGROUND

Within the field of additive manufacturing, so-called three-dimensional printing, or 3D printing, by means of photo-curing a viscous, liquid resin (typically a liquid polymer) layer-by-layer to form a desired object has become very popular.

SUMMARY OF THE INVENTION

In one embodiment, a method of manufacturing a membrane assembly for a three-dimensional printer is provided. Within a tensioning apparatus that includes a base portion, an upper portion, and a jig configured to receive a lower frame piece of the membrane assembly, the lower frame piece of the membrane assembly is positioned on the jig. A piece of flexible membrane material is secured over the lower frame piece of the membrane assembly, e.g., by bringing the base portion and upper portion of the tensioning apparatus together with the piece of flexible membrane at least partially between them. A vacuum is pulled so as to make taut a portion of the flexible membrane material over the lower frame piece of the membrane assembly. While the vacuum is being pulled, an upper frame piece of the membrane assembly is fitted to the lower frame piece of the membrane assembly, securing the portion of the flexible membrane material between the upper and lower frame pieces of the membrane assembly. The vacuum is removed and excess portions of the flexible membrane material outside a perimeter of the membrane assembly may be trimmed away.

The base portion of the tensioning apparatus may have a number of holes through an upper plate of the base portion, and the vacuum may thus be pulled by evacuating air through the holes in the upper plate of the base portion via a pump. The upper portion of the tensioning apparatus may be attached to the base portion the tensioning apparatus by one or more hinges and the base portion and upper portion of the tensioning apparatus may thus be brought together by rotating one relative to the other around an axis of the one or more hinges. Prior to pulling the vacuum, the upper portion and the base portion of the tensioning apparatus may also (or alternatively) be clamped together.

A tensioning apparatus for manufacturing a membrane assembly for a three-dimensional printer according to an embodiment of the present invention may include a base portion, an upper portion, and a jig configured to receive a lower frame piece of a membrane assembly. The jig may be arranged on the base portion and shaped to receive a lower frame piece of the membrane assembly. A vacuum pump may be coupled to evacuate air from the tensioning apparatus when a flexible membrane material is being fitted to the lower frame piece of the membrane assembly.

As mentioned, the base portion of the tensioning apparatus may have a number of holes through an upper plate thereof, and the pump may be coupled to evacuate air from the tensioning apparatus by evacuating air through the holes in the upper plate of the base portion. As above, the base portion and upper portion of the tensioning apparatus may be secured to one another by one or more hinges. Additionally, or alternatively, the tensioning apparatus may include one or more clamps arranged to secure the base portion and upper portion of the tensioning apparatus together. The jig may have a rim (to accommodate the lower frame piece of the membrane assembly) adjustable in terms of its vertical displacement above the upper plate of the base portion.

These and further embodiments of the invention are described in greater detail below.

BRIEF DESCRIPTION OF THE DRAWINGS

The present invention is illustrated by way of example, and not limitation, in the figures of the accompanying drawings, in which:

FIG. 4 is a process flow diagram illustrating steps in a method for ensuring that membrane assemblies such as those shown in FIG. 3 are constructed in such a manner so as to ensure consistent tensioning of the membranes within their respective frames, in accordance with an embodiment of the present invention.

DETAILED DESCRIPTION

In the following description of embodiments of the invention, reference is made to the accompanying drawings that form a part hereof, and in which are shown by way of illustration specific embodiments in and by which the invention may be practiced. It should be understood that other embodiments may be realized based on the teachings presented herein without departing from the scope of the present invention. Description associated with any one of the figures may be applied to a different figure containing like or similar components.

Figure 1:
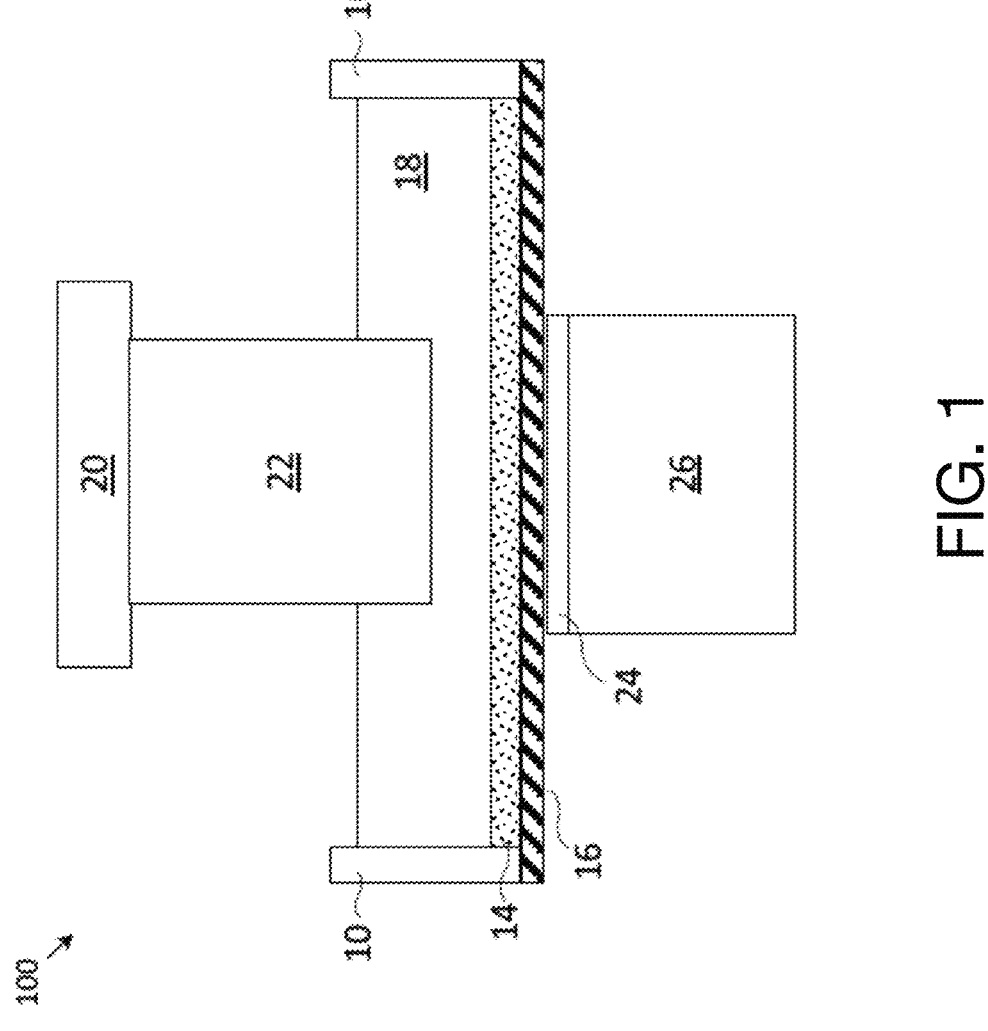
FIG. 1 depicts a schematic cross-section of a 3D printing system in which an object undergoes fabrication in a tank containing a photo-curing liquid resin.

FIG. 1 depicts a cross-section of 3D printing system 100, in which electromagnetic radiation (e.g., ultra-violet ("UV") light) is used to cure a photo-curing liquid resin (typically a liquid polymer) 18 in order to fabricate an object (e.g., a 3D object) 22. Object 22 may be fabricated layer by layer (i.e., a new layer of the object may be formed by photo-curing a layer of liquid polymer 18 adjacent to the bottom surface of the object), and as each new layer is formed the object may be raised by extractor plate 20, allowing a next layer of photo-curing liquid resin 18 to be drawn under the newly formed layer. This process may be repeated multiple times to form additional layers until fabrication of the object is complete.

The 3D printing system 100 may include tank 10 for containing the photo-curing liquid resin 18. The bottom of tank 10 (or at least a portion thereof) is sealed (i.e., to prevent the photo-curing liquid polymer 18 from leaking out of tank 10) by a flexible membrane 14, which is transparent (or nearly so) at wavelengths of interest for curing of the resin to allow electromagnetic radiation from a light source 26 to enter into tank 10. A mask 24 (e.g., a liquid crystal layer) may be disposed between light source 26 and the photo-curing liquid resin 18 to allow the selective curing of the liquid resin (which allows the formation of 3D object into intricate shapes/patterns). In various embodiments, collimation and diffusion elements such as lenses, reflectors, filters, and/or films may be positioned between mask 24 and light source 26. These elements are not shown in the illustrations so as not to unnecessarily obscure the drawings.

One challenge faced by 3D printing systems of the kind illustrated in FIG. 1 is that in addition to adhering to the object, the newly formed layers have a tendency to adhere to the bottom of tank. This is an undesirable situation as a newly formed layer could tear off from the remainder of the object of which it is a part when the extractor plate (and, hence, the object) is raised. To address this issue, the flexible membrane 14 (which may but need not necessarily be a self-lubricating membrane) is disposed at, and in this example forms, the bottom of tank 10 (or at least a portion thereof). The flexible membrane 14 may be formed of silicone or other flexible material, and may, in some instances, be enriched or coated with polytetrafluoroethylene (PTFE) to further increase its "non-stick" quality.

A platen or backing member 16 disposed between the mask 24 and the flexible membrane 14 provides structural support and is also transparent (or nearly so) at the one or more wavelengths of interest for curing the resin. Such a platen may be formed of borosilicate glass or other material. In other instances, platen 16 may be metal or plastic and include a transparent window to allow electromagnetic radiation from light source 26 to enter into tank 10. In other embodiments, the mask 24 itself may be used in place of a separate window and its perimeter sealed with a gasket. Note that although the mask 24, platen 16, and membrane 14 are shown as being displaced from one another by some distance, in practice these components may be positioned so as to touch one another, so as to prevent refraction at any air interfaces. Flexible membrane 14 is included within a frame (not shown in this view) that is secured to the edges of tank 10 so as to maintain a liquid-tight perimeter at the edges of the tank or other opening ("liquid-tight" meaning that the tank does not leak during normal use). Collectively, the flexible membrane and its frame may form a replaceable cartridge-like assembly.

So as to provide consistency across various printing operations, the membrane 14 is maintained within its frame under biaxial strain over its longitudinal and transverse extents. By keeping the membrane under biaxial strain, the membrane exhibits a tendency to maintain its shape in a plane defining the bottom of the tank. This is useful because as the extraction plate, and, hence, the object under construction, is raised during the printing process, so too is the membrane deformed in the direction of the rising extraction plate. This is because the polymer resin is very viscous and there is an absence of air (i.e., a vacuum or partial vacuum) between the newly formed layer of the object under construction and the membrane. Consequently, as that newly formed layer rises (as a result of the raising of the extraction plate), the membrane is drawn upwards (i.e., flexes) in an area immediately beneath the newly formed layer. The tension imparted in the membrane, however, causes the membrane to gradually peel away from the newly formed layer of the object and return to its original, planar position. This gradual separation of the membrane and the newly formed layer of the object reduces mechanical stresses on the newly formed polymer layer, thereby reducing the risk of that layer tearing away from the previously formed portions of the object under construction.

When fabricating a layer of object 22 using 3D printing system 100, electromagnetic radiation is emitted from radiation source 26 through mask 24, platen 16, and membrane 14 into tank 10. The electromagnetic radiation may form an image on an image plane adjacent the bottom of object 22. Areas of high (or moderate) intensity within the image may cause curing of localized regions of the photo-curing liquid resin 18. The newly cured layer adheres to the former bottom surface of object 22 and substantially does not adhere to the bottom surface of tank 10 due to the presence of flexible membrane 14. After the newly cured layer has been formed, the emission of electromagnetic radiation may temporarily be suspended (or not, in the case of "continuous printing") while the extraction plate 20 is raised away from the bottom of the tank so that another new layer of object 22 may be printed.

Figure 2:
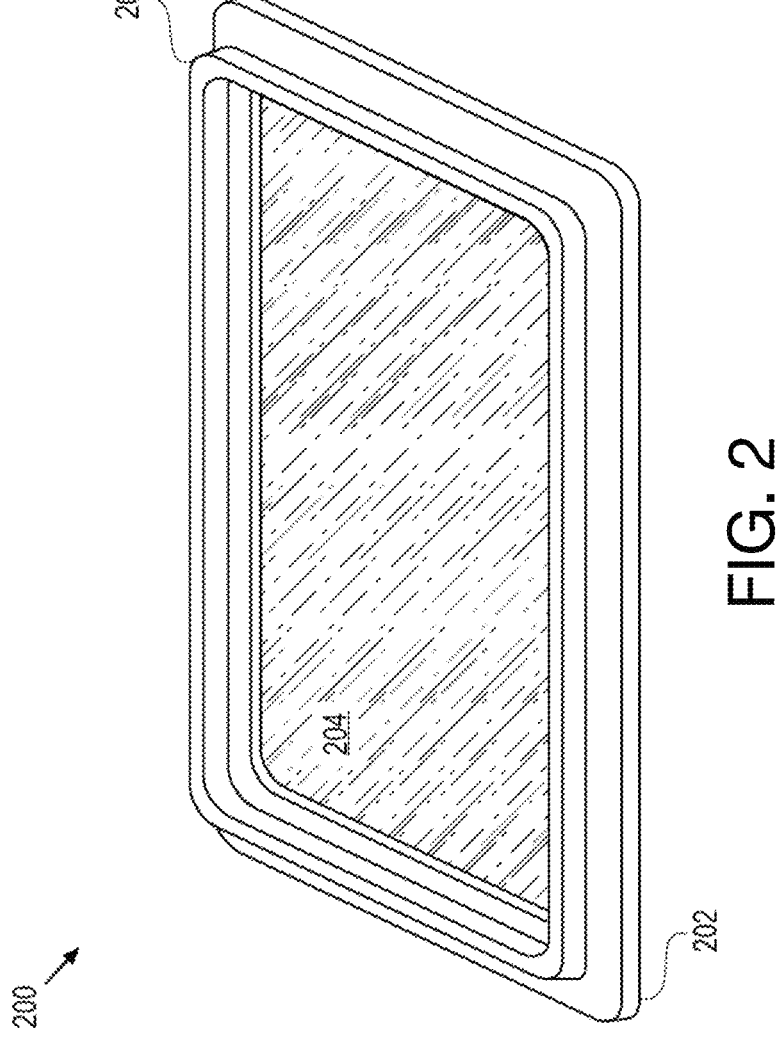
FIG. 2 shows a perspective view of a membrane assembly for a 3D printing system such as the 3D printing system illustrated in FIG. 1.

Referring now to FIG. 2, a perspective view of a membrane assembly 200 for a 3D printing system such as system 100 is shown. Membrane assembly 200 includes a radiation-transparent flexible membrane 204 whose perimeter is secured to frame 202. Frame 202 may be configured to maintain membrane 204 under biaxial tension, as described above. Frame 202 may comprise lip 206 that extends in a direction perpendicular to the plane of the membrane 204. Lip 206 may be secured to a bottom rim of a tank sidewall to provide the liquid-tight fit discussed above. Membrane assembly 200, when secured to the bottom rim of the tank sidewall, forms a bottom of a tank configured to contain a photo-curing liquid resin. In FIG. 2, frame 202 is depicted to have a rectangular shape, however, other shapes for frame 202 and membrane 204 are possible, including square, oval, circular, etc.

Figure 3:
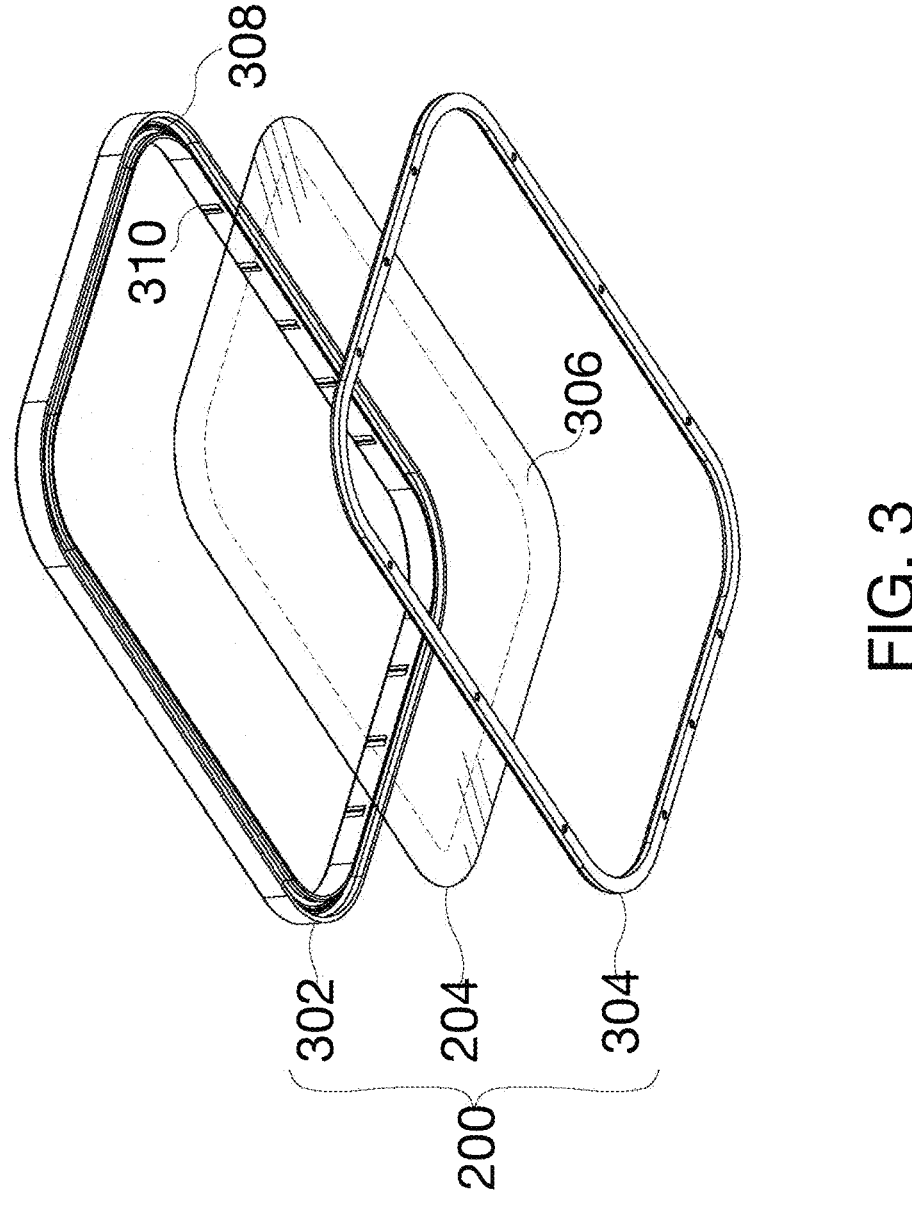
FIG. 3 depicts a perspective exploded view of the membrane assembly shown in FIG. 2.

FIG. 3 depicts a perspective exploded view of membrane assembly 200. Membrane assembly 200 includes upper frame piece 302, flexible membrane 204 and lower frame piece 304. Together, upper frame piece 302 and lower frame piece 304 make up frame 202 shown in FIG. 2. As will be explained in detail below, perimeter portion 306 of flexible membrane 204 is secured between lower frame piece 304 and upper frame piece 302 such that the flexible membrane 204 is biaxially tensioned when maintained within frame assembly 200. In one embodiment, a groove 308 of the underside of upper frame piece 302 may have an up-side-down U-profile that is complementary to the cross section of lower frame piece 304, allowing the upper frame piece to securely fit over and align to the lower frame piece 304. The upper and lower frame pieces may be secured together, sandwiching flexible membrane 204 between them, by a plurality of screws threaded through screw holes 310 about the perimeter of the upper frame piece 302.

In order to ensure consistency of printing operations from job to job and from printer to printer, it is important that membranes 204 be maintained within their respective frames 202 at a desired, and consistent, tension. That is, the tenson of one membrane within its frame should be approximately the same as the tension of another membrane within its frame so that consistent printing results can be maintained and reproduced across changes of membranes and frames (e.g., cartridges) of a given printer and across different printers that employ different cartridges. This way various printing "recipes" for various articles can be used across different printers and/or different cartridge changes with an expectation of generally consistent results across different print jobs.

To achieve this goal, the present invention provides a mechanism and process for securing the flexible membrane within the frame in a manner that ensure approximately consistent tensioning of the membrane therein. Referring to FIG. 4, which is a process flow diagram, and FIGS. 5-9, which illustrate the use of the tensioning apparatus at various steps in the process, the subject mechanism and process will be described. As will become apparent, the process involves fitting the lower frame piece 304 within the tensioning apparatus and securing a section of flexible membrane material between the lower frame piece 304 and the upper frame piece 302. The tensioning apparatus is then configured for application of vacuum that stretches the flexible membrane material within the two halves of the frame. The frame halves are then secured together, trapping the flexible membrane between them at the imposed tension. Thereafter, the vacuum can be released, the flexible membrane material trimmed, and the completed frame assembly removed from the tensioning apparatus.

Figure 5:
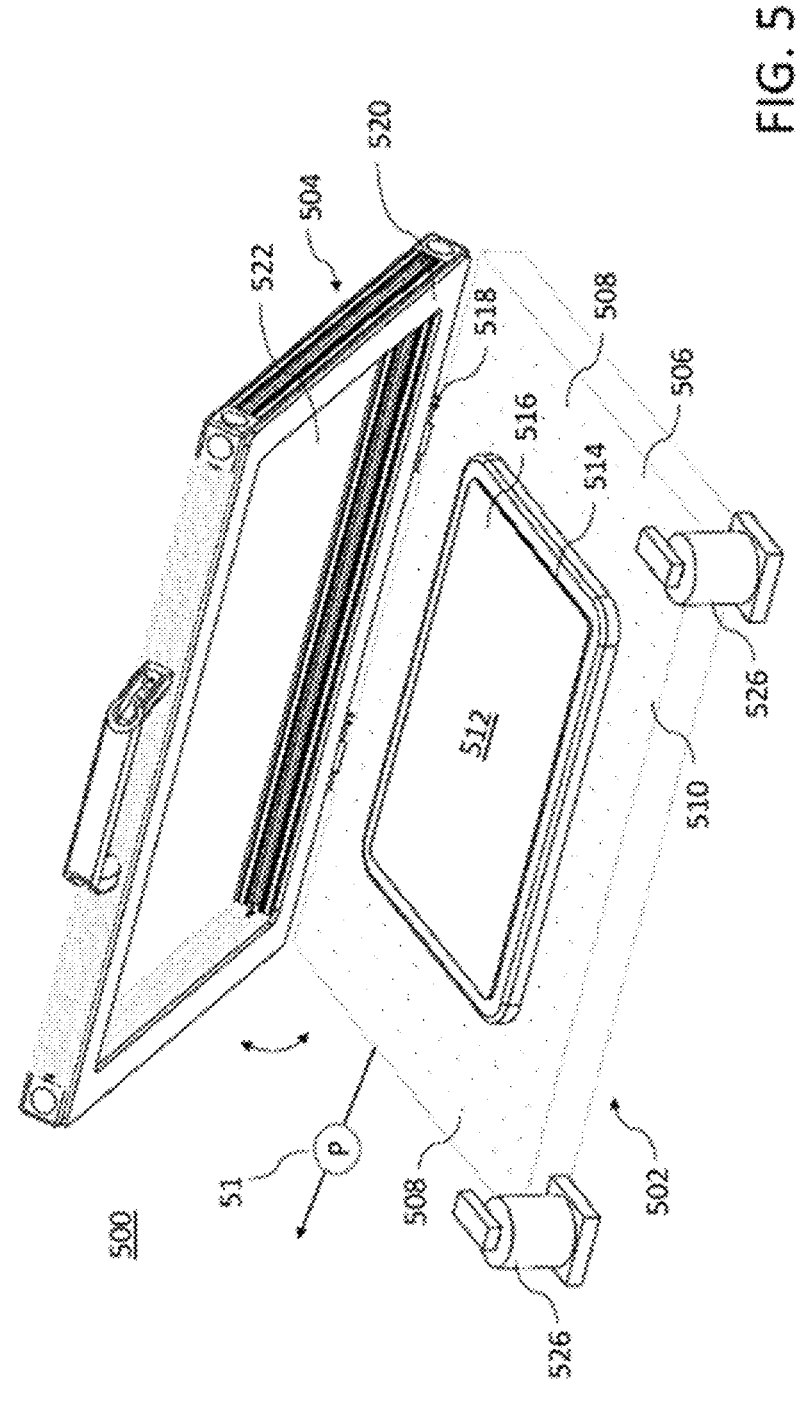
FIGS. 5-9 illustrate examples of a system for tensioning a flexible membrane with a frame and its use according to the process shown in FIG. 4 at various stages within that process.

FIG. 5 shows an example of the tensioning apparatus 500 before the lower frame piece 304 of membrane assembly 200 is secured therein. Tensioning apparatus 500 includes a base portion 502 and an upper portion 504. Base portion 502 includes a plate 506 having a plurality of holes 508 therethrough. The plate 506 is maintained above a bottom of the base portion and surrounded by a frame 510. A vacuum pump 51 is arranged so as to be able to pump down the tensioning apparatus by causing air to be evacuated from the bottom of the base portion 502 beneath the plate 506 and through holes 508. Any appropriate plumbing may be used for such purposes. For example, one or more chambers below plate 506 may be fitted with conduits to allow for air to be evacuated via pump 51.

Fitted over plate 506 is a jig 512. Jig 512 is shaped to accommodate the lower frame piece 304 of membrane assembly 200 and includes a rim 514 on which the lower frame piece 304 may rest when in place. When the lower frame piece 304 rests on the rim 514 of jig 512, the lower frame piece 304 is kept securely in place with a center portion 516 of jig 512 protruding into the central opening of the lower frame piece 304. The height of the rim 514 above the plate 506 is established so as to provide a desired tension of the flexible membrane material when a vacuum is applied by pump 51. In some embodiments, the height of the rim 514 above the plate 506 may be adjustable (e.g., using a rachet mechanism to adjust the vertical displacement of the rim 514 above plate 506) and may be set empirically by testing the printing performance of membrane assemblies constructed using different rim heights until a suitable tension for a desired printing performance is achieved.

The upper portion 504 of tensioning apparatus 500 is attached to the base portion 502 by one or more hinges 518. The hinge(s) may run the length of the side on which the upper portion 504 and base portion 502 are joined, or may only run a portion of that length. Any suitable hinge(s) may be used, for example piano hinges, or other type of hinges.

In some embodiments, the upper portion 504 and base portion 502 are not joined to one another and instead are separate pieces that are mated together only prior to a vacuum being pulled by pump 51. In such cases, the upper portion 504 and base portion 502 may be clamped together on two or more sides of each prior to pulling of a vacuum so that the two pieces do not shift with respect to one another during the membrane assembly manufacturing process. In other embodiments, the upper portion 504 and base portion 502 may be designed to interlock with one another using a joint that ensure they will remain attached to one another during pulling of the vacuum. In some cases, the upper portion 504 is fitted with a gasket 520 along its interior underside so that when it secures a piece of membrane material between itself and the frame 510 of base portion 502 an air tight (or nearly so) seal is created. This will help ensure that the vacuum is applied uniformly across the extent of the membrane material during manufacture of a membrane assembly 200.

The interior 522 of the upper portion 504 of tensioning apparatus 500 is empty (i.e., is open). Thus, when the upper portion 504 is lowered over the base portion 502, it contacts only an outer edge 510 defining a perimeter of base portion 502 or a piece of membrane material disposed between the upper and lower portions 502, 504 or the tensioning apparatus 500. This allows the upper frame piece 302 of membrane assembly 200 to be positioned and secured in place atop the lower frame piece 304 during the manufacture of a membrane assembly 200.

Figure 6:
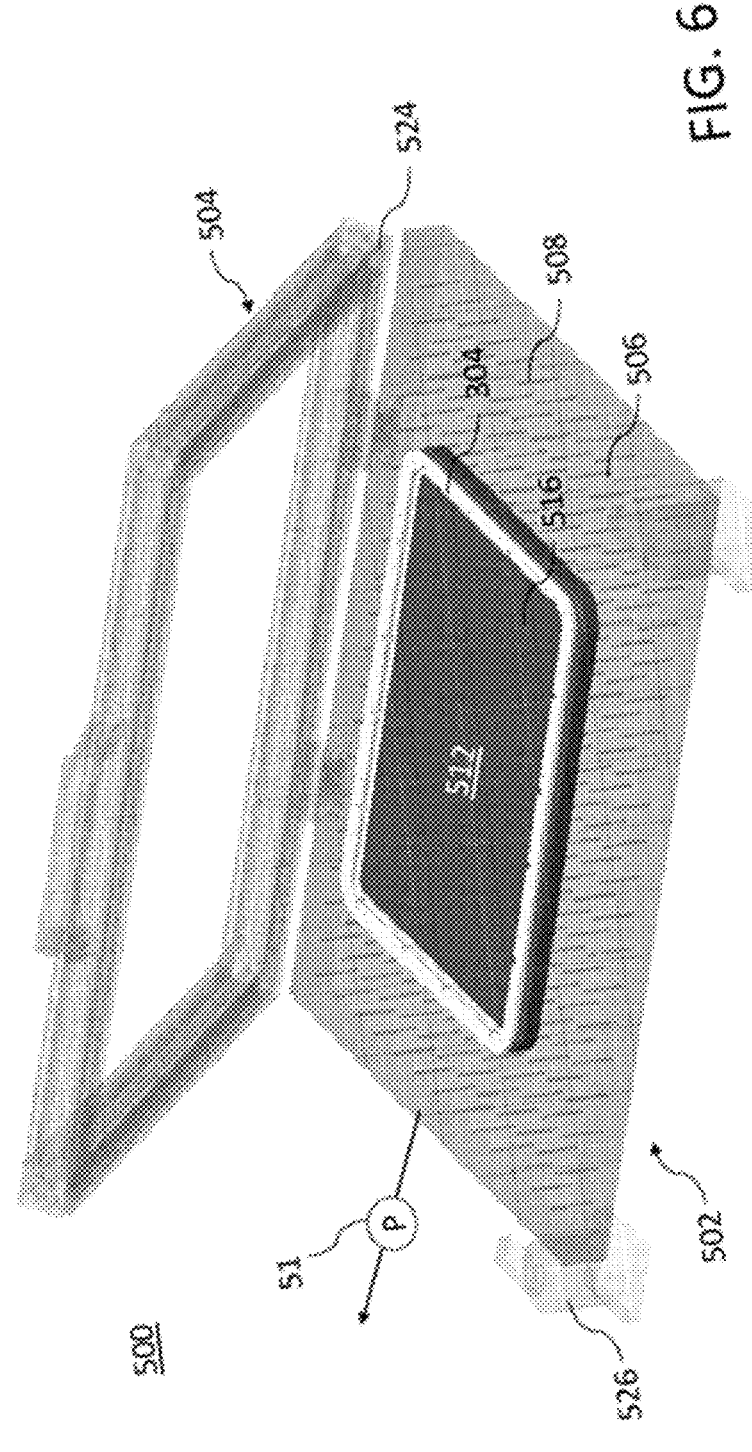

Referring to FIG. 4, a process 400 for securing the flexible membrane within its frame in a manner that ensures approximately consistent tensioning of the membrane therein begins with step 402 in which the tensioning apparatus is placed in a configuration as shown in FIG. 5, with the upper portion 504 open, that is not placed over the frame 510 of the base portion 502. Next, at step 404, the lower frame piece 304 is placed onto jig 512 of tensioning apparatus 500, as illustrated in FIG. 6. Because the jig is sized appropriately to lower frame piece 304, the lower frame piece 304 fits snugly about the perimeter of center portion 516 of jig 512, resting on rim 514 (not visible in this view). The upper surface of center portion 516 of jig 512 should extend no further than the portion of lower frame piece 304 on which the flexible membrane material will contact when secured by upper frame piece 302 and, preferably, is sized to be slightly lower than same when the lower frame piece 304 is in position on jig 512. FIG. 6 shows the lower portion 502 of tensioning apparatus 500 in partial transparency to highlight the through holes 508 that will allow for pumping down of the tensioning apparatus via pump 51.

Figure 7:
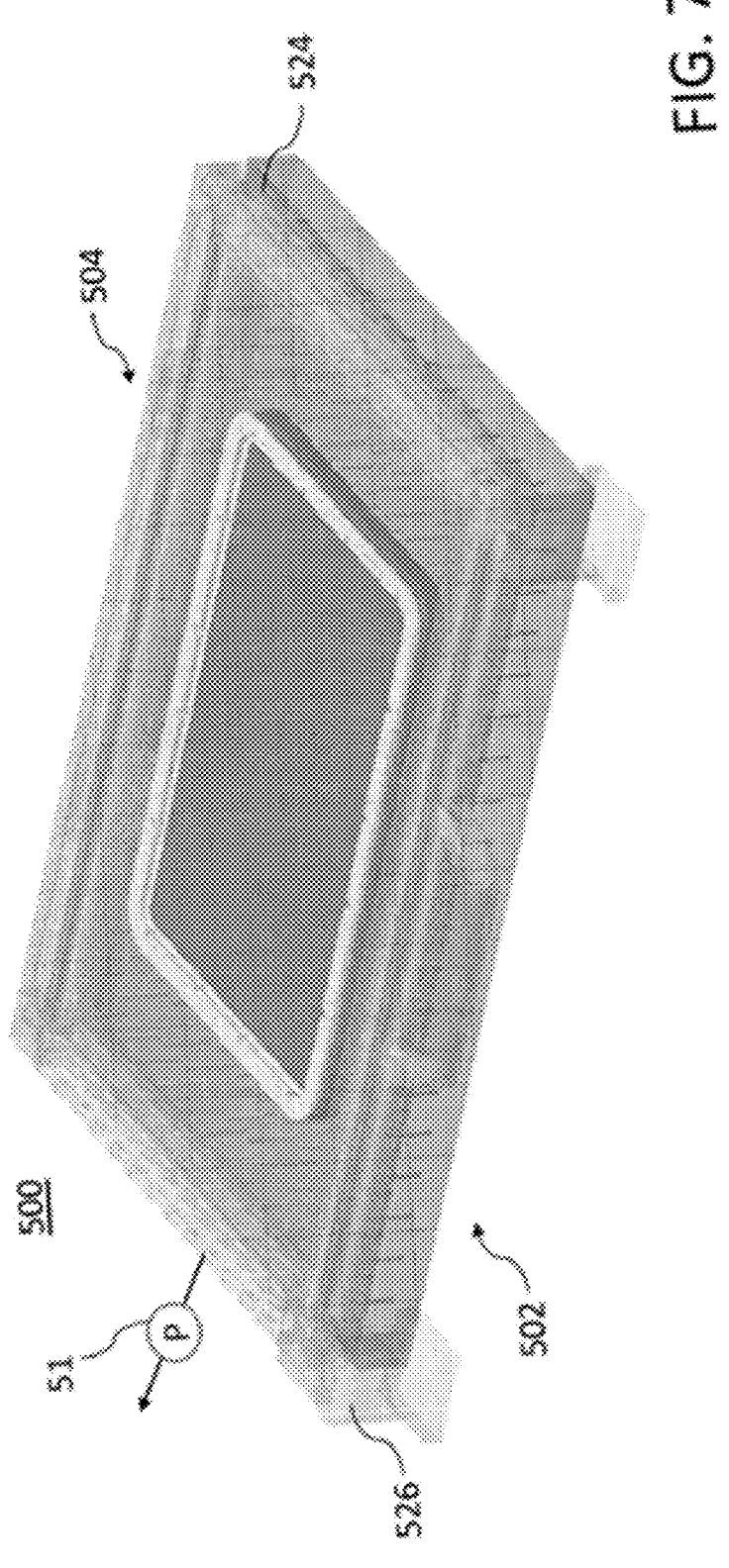

At step 406, a sheet of flexible membrane material 524 is inserted atop the lower frame piece 304 and, at step 408, the upper portion 504 of the tensioning apparatus is closed atop the lower portion 502 thereof, as shown in FIG. 7. For example, the base portion and upper portion of the tensioning apparatus may be brought together by rotating one relative to the other around an axis of the one or more hinges by which they are connected to one another. The dimensions of the flexible membrane material 524 should preferably be such as to ensure the flexible membrane material 524 overlaps the edges of frame 510 of the base portion 502 of tensioning apparatus 500 so that the outer perimeters of the upper portion 504 and lower portion 502 of tensioning apparatus 500 contact the flexible membrane material 524 when closed together. Lowering the upper portion 504 of the tensioning apparatus 500 in place over the lower portion 502 thus secures the flexible membrane material 524 between them around the perimeter of the tensioning apparatus.

Figure 8:
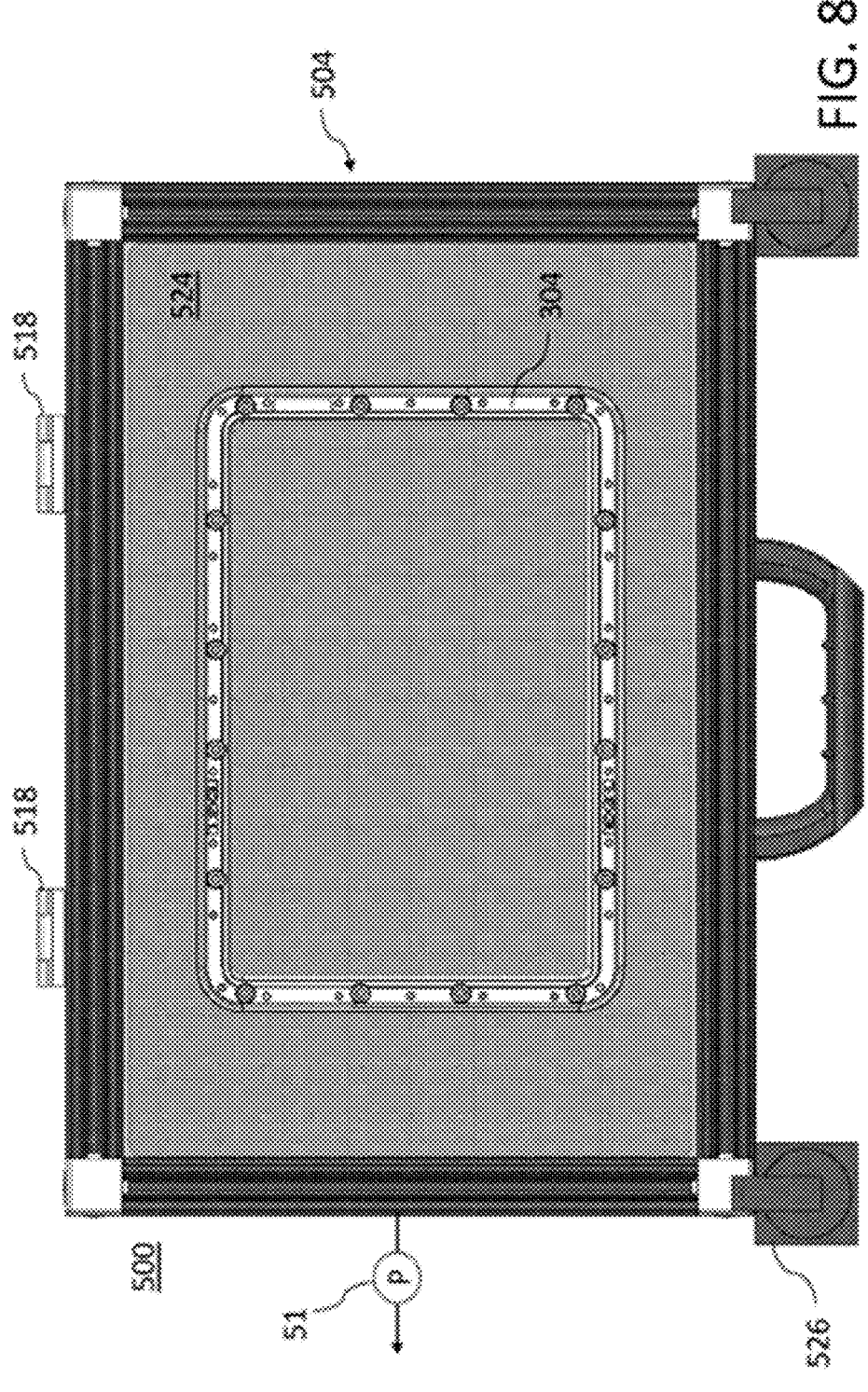

If necessary, at step 410, the upper and lower frame portions are secured together, e.g., using one or more clamps 526. Then, at step 412, the pump 51 can operated to pull a vacuum. FIG. 8 shows a top view of the situation shown in FIG. 7, with the upper portion 504 and lower portion 502 of tensioning apparatus 500 closed together, holding the flexible membrane material 524 securely about the perimeter of the tensioning apparatus 500 and over the lower frame piece 304. Clamps 526 are engaged at the corners of the tensioning apparatus 500 to ensure the assembly remains in this configuration when vacuum is applied.

Recall that the tensioning apparatus is configured so that when air is evacuated from the base portion 502 of the tensioning apparatus, it is evacuated through holes 508 in plate 506. However, because the sheet of flexible membrane material 524 covers the extent of plate 506, it will be pulled taut as a result of the vacuum pressure created by the operation of pump 51. That is, the flexible membrane material 524 will be stretched across the face of the lower frame piece 304 to a degree depending on the height of the lower frame piece above the plate 506. Above it was noted that this height can be adjusted, e.g., by positioning jig 512 on a vertically adjustable mount, so as to ensure a desired amount of tensioning of the flexible membrane material is achieved.

Figure 9:
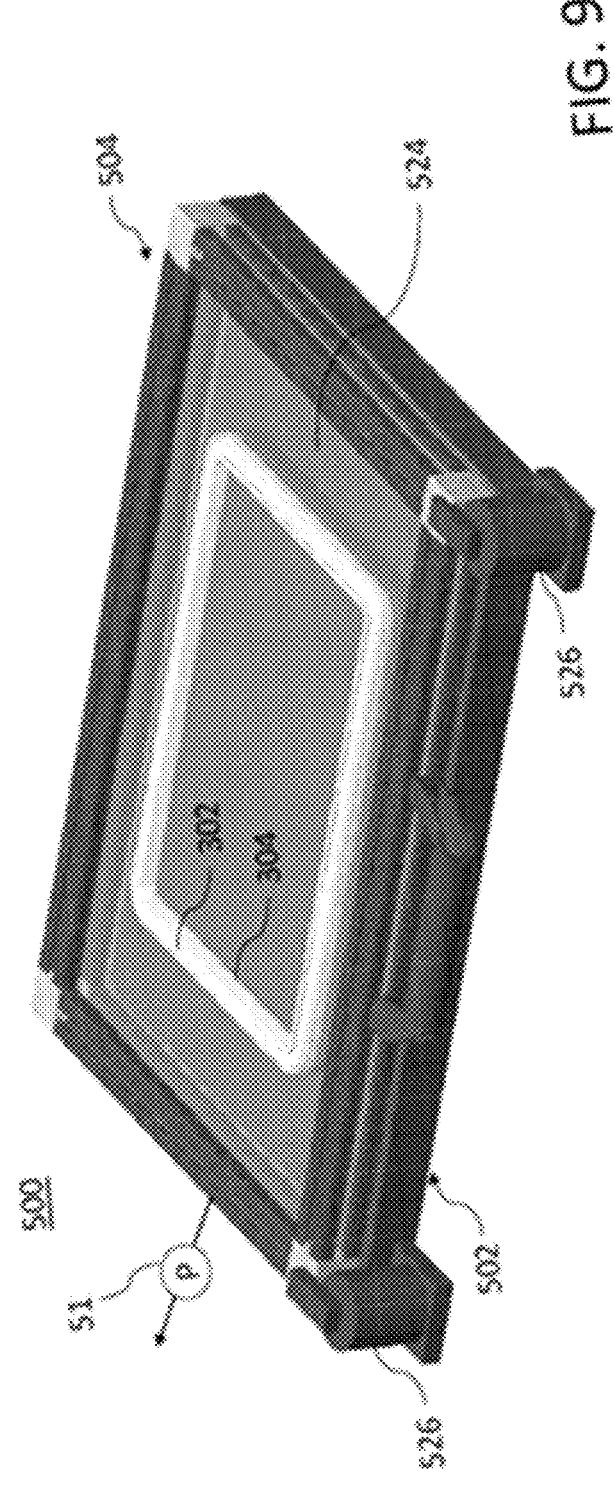

Accordingly, vacuum is applied, step 412, and while the vacuum being maintained by pump 51, at step 414, the upper frame piece 302 may be secured atop the lower frame piece 304, trapping the tensioned flexible membrane material 524 between them, as shown in FIG. 9. Once the two frame pieces are secured together, at step 416 the vacuum may be removed by turning off pump 51 and the flexible membrane material trimmed to conform to the edges of the two frame pieces 302, 304. The completed membrane assembly 200 may then be removed from the tensioning apparatus 500. Alternatively, trimming of the flexible membrane material may be completed after the frame pieces and flexible membrane material are removed from the tensioning apparatus. The assembly process may be repeated as desired to assemble a number of membrane assemblies and because the jig 512 maintains the lower frame piece 304 at a consistent height above plate 506 of the tensioning apparatus, each membrane assembly will have a similarly tensioned membrane as one of its constituents.

A particular advantage of the disclosed process is that it also inherently provides quality assurance. If there are any pinholes or other defects in the flexible membrane material, that will become immediately apparent when the vacuum is pulled during manufacture of the membrane assembly. In particular, a hole in the flexible membrane material will prevent the membrane from being tensioned across the lower frame piece 302 during the manufacturing process because air will be drawn through that hole, preventing a vacuum from being formed between the plate 506 of the tensioning apparatus and the defective flexible membrane material.

Optionally, machine visioning systems may be employed to inspect the assembled membrane assembly prior to its removal from the tensioning apparatus (or thereafter, as preferred). In such embodiments, visual inspection of the completed membrane assembly using one or more cameras may be used and images of the completed membrane assembly compared against models of properly assembled such items used to evaluate the quality of each completed membrane assembly as it is finished. Defective membrane assemblies can be disposed of and their frame pieces recycled for use in later-fashioned membrane assemblies.

Thus, methods and systems for ensuring that assemblies which include such a membrane in a frame are constructed in such a manner so as to ensure consistent tensioning of the membranes within their frames have been described.

What is claimed is:

1. A method of manufacturing a membrane assembly for a three-dimensional printer, wherein the three-dimensional printer includes a tensioning apparatus for manufacturing the membrane assembly for the three-dimensional printer, the tensioning apparatus comprising a base portion, an upper portion, and a jig configured to receive a lower frame piece of said membrane assembly, the jig arranged on the base portion and shaped to receive said lower frame piece of the membrane assembly; and the base portion having a number of holes through an upper plate of the base portion through which air can be evacuated from the tensioning apparatus when a flexible membrane material is being fitted to the lower frame piece of the membrane assembly; wherein the jig has a rim adjustable in terms of its vertical displacement above the upper plate of the base portion; and the method comprising:

within the tensioning apparatus:

positioning the lower frame piece of the membrane assembly on the jig, and securing a piece of the flexible membrane material over the lower frame piece of the membrane assembly by bringing the base portion and upper portion of the tensioning apparatus together with the piece of the flexible membrane at least partially between them; and pulling a vacuum by evacuating air through the holes of the upper plate of the base portion so as to make taut a portion of the piece of the flexible membrane material over the lower frame piece of the membrane assembly;

wherein said positioning comprises adjusting the rim of the jig in terms of its vertical displacement above the upper plate of the base portion.

2. The method of claim 1, wherein the vacuum is pulled by evacuating air through the holes in the upper plate of the base portion via a pump.

3. The method of claim 2, wherein the upper portion of the tensioning apparatus is attached to the base portion of the tensioning apparatus by one or more hinges and the base portion and upper portion of the tensioning apparatus are brought together by rotating one relative to the other around an axis of the one or more hinges.

4. The method of claim 2, wherein prior to pulling the vacuum, the upper portion and the base portion of the tensioning apparatus are clamped together.

5. The method of claim 1, comprising:

while the vacuum is being pulled, fitting an upper frame piece of the membrane assembly to the lower frame piece of the membrane assembly, securing the portion of the flexible membrane material between the upper and lower frame pieces of the membrane assembly; and removing the vacuum and trimming excess portions of the flexible membrane material outside a perimeter of the membrane assembly.

6. A tensioning apparatus for manufacturing a membrane assembly for a three-dimensional printer, the tensioning apparatus comprising:

a base portion, an upper portion, and a jig configured to receive a lower frame piece of said membrane assembly, the jig arranged on the base portion and shaped to receive said lower frame piece of the membrane assembly;

one or more clamps arranged to secure the base portion and upper portion of the tensioning apparatus together, the base portion and upper portion of the tensioning apparatus being secured to one another by one or more hinges; and a vacuum pump coupled to evacuate air from the tensioning apparatus when a flexible membrane material is being fitted to the lower frame piece of the membrane assembly; wherein:

the base portion of the tensioning apparatus has a number of holes through an upper plate of the base portion, and the pump is coupled to evacuate air from the tensioning apparatus by evacuating air through the holes in the upper plate of the base portion; and the jig has a rim adjustable in terms of its vertical displacement above the upper plate of the base portion.

7. A tensioning apparatus for manufacturing a membrane assembly for a three-dimensional printer, the tensioning apparatus comprising:

a base portion, an upper portion, and a jig configured to receive a lower frame piece of said membrane assembly, the jig arranged on the base portion and shaped to receive said lower frame piece of the membrane assembly; and the base portion having a number of holes through an upper plate of the base portion through which air can be evacuated from the tensioning apparatus when a flexible membrane material is being fitted to the lower frame piece of the membrane assembly;

wherein the jig has a rim adjustable in terms of its vertical displacement above the upper plate of the base portion.

8. The tensioning apparatus of claim 7, wherein the base portion and upper portion of the tensioning apparatus are secured to one another by one or more hinges.

9. The tensioning apparatus of claim 7, further comprising one or more clamps arranged to secure the base portion and upper portion of the tensioning apparatus together.

* * * * *